Jordan & Smith.

Wrench.

No. 3,852. Reissued Feb. 22. 1870.

Witnesses;
Wm Frewen
Geo Finch

Inventor;
L Jordan
L Smith
By Munn & Co
Attys

United States Patent Office.

THE COLLINS COMPANY, OF COLLINSVILLE, CONNECTICUT, ASSIGNEE OF LUCIUS JORDAN AND LEANDER E. SMITH.

*Letters Patent No.* 50,364, *dated October* 10, 1865; *reissue No.* 3,852, *dated February* 22, 1870.

IMPROVEMENT IN WRENCHES.

The Schedule referred to in these Letters Patent and making part of the same

*To all whom it may concern:*

Be it known that LUCIUS JORDAN and LEANDER E. SMITH, of Southington, Connecticut, invented a new and useful Improved Wrench; and that the following is a full and exact description thereof, reference being had to the accompanying drawings, and to the letters of reference marked thereon, making a part of this specification.

Like letters indicate like parts in both figures.

Figure 1:
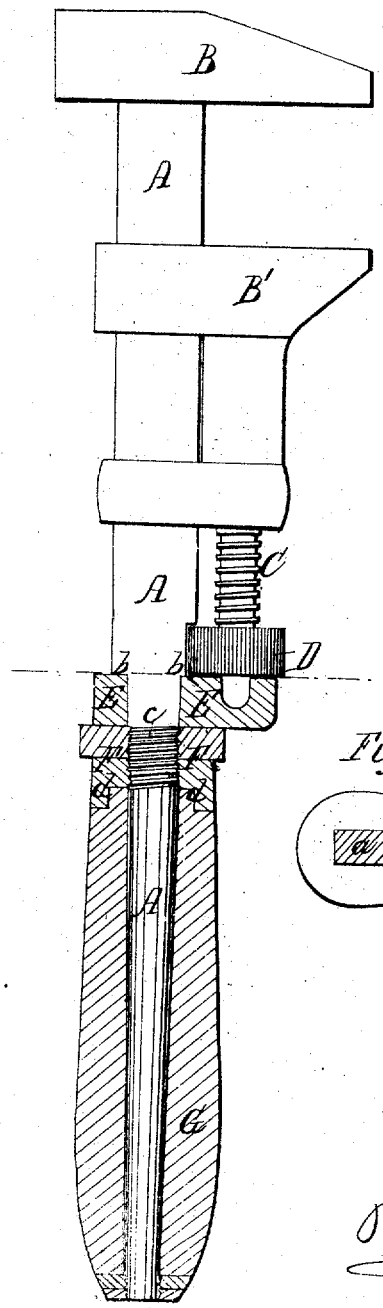
Figure 1 is a side elevation, the part below the dotted line *x x* being in section.
Figure 2:
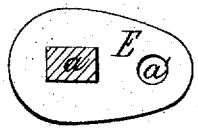
Figure 2 is a plan view of the top of the step or ferrule which forms a bearing for the end of the screw-rod.

This invention consists in a device for preventing end thrusts or back pressure on the wooden handle of the wrench, which has heretofore availed to quickly destroy such wooden handles, and is accomplished by fastening the step, which forms a bearing for the screw-rod, firmly to the iron bar which forms the main part of the wrench, by a nut on said bar pressing up against the step, that is to say, said invention consists in—

First, the employment or use of a step which forms a bearing for, and into which is fitted to work the end or journal of the screw-rod, upon which is the rosette or nut by which the sliding jaw of the wrench is operated, and against which step the said rosette or nut bears; and Second, the rigid fastening or securing the said step in place and in its proper position upon the wrench-bar by a nut which is screwed upon a thread cut upon the bar of the wrench, or by some equivalent device, so that it will bear firmly against the said step.

Third, the combination and use of said step and the nut screwed upon the bar of the wrench, to prevent the end thrust or back pressure upon the handle of the wrench.

The letter A indicates the bar of the wrench, flat sided down to the screw *i*, and from thence downward cylindrical, or of other convenient shape, so as to take upon it the wooden handle G.

The letter C indicates the screw-rod D, the nut or rosette for operating the sliding jaw B.

The letter E indicates a step in which is the bearing for the lower end of the screw-rod C, having a hole, *a*, through it, fitting on the bar A up against the shoulder *b b*, the hole *a* being made, of course of a shape to conform to the shape of the bar A at that point, be the same round, square, or otherwise shaped.

On the bar A, just below where the step E fits on, is cut the screw-thread *i* on which screws the nut F, which, bearing firmly up against the step E, holds it securely in place and sustains all back pressure or end thrust which may be put upon the wrench when in use, thereby entirely relieving the wooden handle G from the customary strain.

Heretofore the part designed to perform the office of the step E rested upon the wooden handle, which, in turn, has been secured upon the bar A by means of a light nut at the lower extremity of the bar, under which arrangement wrenches were continually giving way, a difficulty which is entirely obviated by this invention.

The under side of the nut F may be, though not of necessity, recessed as at *d d*, to receive the upper end of the wooden handle G.

*Claims.*

1. The step E, made substantially as described, and for the purpose set forth.

2. The step E, rigidly fastened to the bar A, as described, whereby it is rendered capable of supporting the back pressure of the screw-rod C.

3. The combination of the step E, the screw-rod C, rosette D, and the nut F, substantially as and for the purpose described.

4. As a new article of manufacture, a wrench as described, with the ferrule or step E, and nut F, secured substantially as described.

THE COLLINS COMPANY,
*By* W. J. WOOD, *Vice President, Manager, and Chief Executive Officer.*

Witnesses:
OLIVER F. PERRY,
E. H. SEARS.